(12) United States Patent
McBrearty et al.

(10) Patent No.: US 8,136,126 B2
(45) Date of Patent: Mar. 13, 2012

(54) OVERRIDING POTENTIAL COMPETING OPTIMIZATION ALGORITHMS WITHIN LAYERS OF DEVICE DRIVERS

(75) Inventors: Gerald Francis McBrearty, Austin, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 12/023,469

(22) Filed: Jan. 31, 2008

(65) Prior Publication Data

US 2009/0199217 A1  Aug. 6, 2009

(51) Int. Cl.
*G06F 9/54* (2006.01)

(52) U.S. Cl. .................................. 719/327; 719/321

(58) Field of Classification Search ................... None
See application file for complete search history.

(56) References Cited

U.S. PATENT DOCUMENTS

| | | | |
|---|---|---|---|
| 5,832,515 A | 11/1998 | Ledain et al. | |
| 5,978,856 A * | 11/1999 | Jones | 711/114 |
| 6,408,344 B1 | 6/2002 | Sakai | |
| 7,194,662 B2 | 3/2007 | Do et al. | |
| 7,222,348 B1 | 5/2007 | Athreya et al. | |
| 7,284,246 B2 * | 10/2007 | Kemp et al. | 719/321 |
| 7,779,425 B2 * | 8/2010 | Pudipeddi et al. | 719/321 |
| 2002/0065962 A1 | 5/2002 | Bakke et al. | |
| 2003/0200477 A1 | 10/2003 | Ayres | |
| 2005/0091441 A1 | 4/2005 | Qi et al. | |
| 2006/0209328 A1 | 9/2006 | Anderson et al. | |
| 2006/0212457 A1 | 9/2006 | Pearce et al. | |
| 2007/0067516 A1 | 3/2007 | Do et al. | |

OTHER PUBLICATIONS

Levasseur et al., "A Sledgehammer Approach to Reuse of Legacy Device Drivers", pp. 1-6, Germany, Proceedings of the 11th ACM European SIGOPS Workshop, Leuven, Belgium, Sep. 19-22, 2004.
Hunt, "Creating User-Mode Device Drivers with a Proxy", pp. 1-6, New York, Proceedings of the 1st USENIX Windows NT Workshop, Seattle, WA, Aug. 1999.

* cited by examiner

*Primary Examiner* — S. Sough
*Assistant Examiner* — Umut Onat
(74) *Attorney, Agent, or Firm* — Yee & Associates, P.C.; Steven L. Bennett (57) ABSTRACT

A method, system, and computer program product for managing data optimization routines in device drivers in a data transmission path. In a data transmission path, data optimization routines associated with device drivers are identified. When data is received in the data transmission path, a determination is made whether a data optimization routine associated with a device driver in the path comprises a same optimization or a competing optimization as a data optimization routine associated with one or more other device drivers in the path. If the data optimization routine for the device driver comprises a same or competing optimization routine as the data optimization routine associated with the other device drivers, one of the device drivers is selected to perform its associated data optimization routine on the data. A notification is sent to the other device drivers in the path to skip their associated data optimization routines on the data.

24 Claims, 4 Drawing Sheets

OVERRIDING POTENTIAL COMPETING OPTIMIZATION ALGORITHMS WITHIN LAYERS OF DEVICE DRIVERS

BACKGROUND OF THE INVENTION

1. Field of the Invention

The present invention relates generally to an improved data processing system, and in particular to a computer implemented method, data processing system, and computer program product for overriding potential competing algorithms within transport layers of device drivers.

2. Description of the Related Art

An operating system comprises software that manages the sharing of resources of a computer and enables software applications to interact with the computer hardware, such as by writing data to a disk (e.g., a hard disk drive). A basic concept in today's operating systems is that in order for data to be moved to a target destination, there are multiple transport layers of device drivers that data must pass through before the data reaches its intended destination. These transport layers are a product of modular programming, which is a key aspect in programming philosophy. Modular programming is used to compose computer programs into separate modules. By using separate modules in this manner, different transport layers can be rotated in and out of the operating system as needed with minimal disruption to the operating system.

One unintended consequence of the modular programming used to implement the multiple transport layers of device drivers in the operating system is that certain actions in one transport layer may be unnecessarily repeated in another transport layer of the path, thereby wasting system resources on a redundant action. Even worse, one transport layer may have a contradictory behavior with the behavior of another transport layer of the path. For instance, some of the transport layers in the data path have embedded optimization algorithms used to enhance system performance and data availability. Some examples of optimization algorithms include various data sorting routines, such as 'elevator', 'closest head', 'least busy', etc. The elevator algorithm obtains different data requests from different sources (such as many people getting on the same elevator and needing to go to different floors) and sorts the data requests into a directional order of traversal, regardless of which order the requests arrived. The disk arm goes across the disk platter in an ascending or descending order (like an elevator going up or down) and picks up the data requests in one smooth action. The closest head algorithm sorts the data so that the request that is processed first is the request which is closest to the data head or arm on the disk drive. This algorithm discounts the order the requests were received. The least busy algorithm is used for mirrored data situations in which there are two (or more) copies of the same data. With the least busy algorithm, a data request is sent to the disk drive which has the fewest number of jobs in its queue.

The optimization algorithms in the layers of a data path may be developed by different programmers or company. For instance, it is possible that one layer of device driver may perform the closest head optimization routine for sorting data. When this layer passes the data to the next layer in the path, the next layer, written by a different programmer or company, may perform the elevator optimization routine for sorting data. Thus, the next layer of device driver in the path may invalidate the sorting algorithm performed by the previous layer. Similarly, system resources may be wasted due to repetition of actions in the data path. For example, two layers of device drivers may perform the same elevator optimization algorithm. In this case, a double-sort of the same data has occurred when one of the layers has wasted a cycle of data optimization that did not need to be performed.

SUMMARY OF THE INVENTION

The illustrative embodiments provide a computer implemented method, data processing system, and computer program product for managing data optimization routines in device drivers in a data transmission path. In a data transmission path, data optimization routines associated with the device drivers are identified. When data is received in the data transmission path, a determination is made as to whether a data optimization routine associated with a device driver in the data transmission path comprises a same optimization or a competing optimization as a data optimization routine associated with one or more other device drivers in the data transmission path. If the data optimization routine associated with the device driver comprises a same optimization routine or a competing optimization routine as the data optimization routine associated with the one or more other device drivers, one of the device drivers is selected to perform its associated data optimization routine on the data. A notification is sent to the one or more other device drivers in the data transmission path to skip their associated data optimization routines on the data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
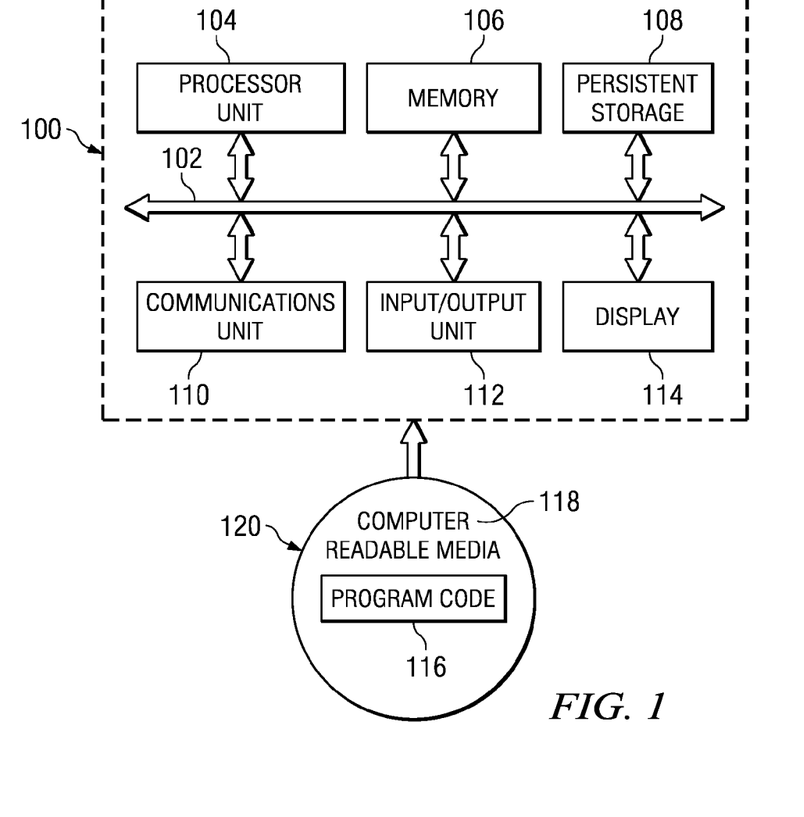
FIG. 1 is a block diagram of a data processing system in which the illustrative embodiments may be implemented.

Turning now to FIG. 1, a diagram of a data processing system is depicted in accordance with an illustrative embodiment of the present invention. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip.

As another illustrative example, processor unit 104 may be a symmetric multi-processor system containing multiple processors of the same type.

Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
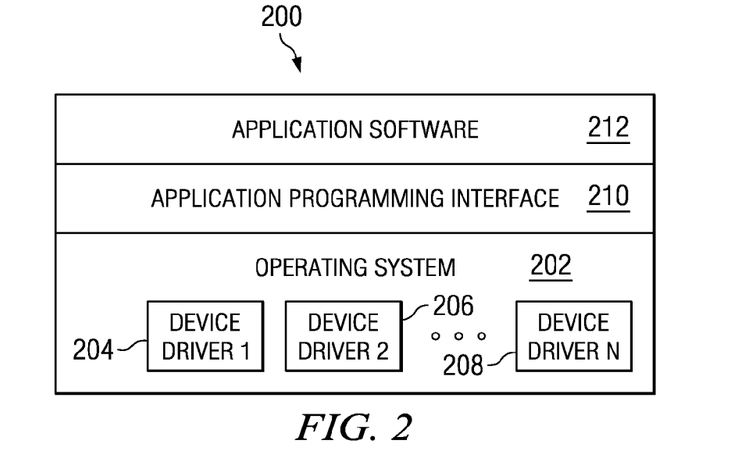
FIG. 2 is a block diagram of a typical software architecture for a data processing system in accordance with the illustrative embodiments.

Turning to FIG. 2, typical software architecture for a data processing system is depicted in accordance with the illustrative embodiments. Within software architecture 200, operating system 202 is provided at the lowest level. Operating system 202 is utilized to provide high-level functionality to the user and to other software. Such an operating system typically includes a basic input output system (BIOS). Operating system 202 may also comprise network access software for allowing the system to access a network. This access may be to a network, such as a local area network (LAN), wide area network (WAN), or the Internet. With the Internet, this software may include programs, such as Web browsers.

Operating system 202 also comprises various device drivers (device drivers 204-208) which provide low level routines to access the computer hardware. When a calling program such as application software 212 invokes a routine in a device driver, the driver issues commands to a hardware device. The device then sends data back to the driver, and the driver may invoke routines in the original calling program.

Application programming interface (API) 210 allows the user of the system, such as an individual or a software routine, to invoke system capabilities using a standard consistent interface without concern for how the particular functionality is implemented. Application software 212 represents any number of software applications designed to react to data through the communications port to provide the desired functionality the user seeks. Applications at this level may include those necessary to handle data, video, graphics, photos or text, which can be accessed by users of the Internet.

As previously mentioned, when moving data to a target destination, there may be multiple transport layers of device drivers that data must pass through before the data reaches its intended destination. Each device driver layer in the data path may comprise hard-coded programming routines comprising tasks for moving the data to its intended destination. These programming routines may also comprise optimization algorithms for enhancing system performance and data availability. The illustrative embodiments provide a solution to the problem of having redundant or competing algorithms being executed in different transport layers of the device drivers. In particular, the illustrative embodiments allow the operating system to prevent redundant or competing optimization routines from being executed in the data path by overriding potential competing algorithms within the transport layers.

The illustrative embodiments allow each device driver in a data path to inform the operating system of the type of optimization algorithm programmed in the device driver. Based on the information provided from the device drivers, the operating system may select one or more layers in the data path to perform their optimization algorithms, while sending an override signal to the remaining device drivers in the data path to inform these device drivers not to perform their optimization functions. Thus, optimization routines in each of the device driver layers may be turned on or off as needed to prevent redundant or competing optimization routines from being executed in the data path. For example, if two layers contain the same programming routine, the operating system may select one of the layers to perform the routine, and also notify the other layer to skip its optimization function, thereby preventing the same function from being unnecessarily repeated in another layer of the path. If the layers contain conflicting routines, the operating system may select one layer to perform its optimization routine, and also notify the other layer to skip its optimization function. In the case of conflicting optimization routines in the data path layers, the operating system may select which data path layer will perform its optimization function and which data path layers will be precluded from performing their optimization functions based on settings provided by the user. In one example, the user may set an option which allows the layer "closest" to the calling program to perform its optimization routine, since this layer is sorting the data at the topmost layer where all the data has been gathered. In another example, the user may set an option to allow the lowest level layer (furthest layer from the calling program) perform the optimization, since this layer is sorting the data at the bottommost layer where the data has been gathered prior to writing the data to disk.

The illustrative embodiments also allow the operating system to specify a plugin optimization routine that may replace any of the hard-coded optimization functions within any of the data transport layers (assuming that the data path layers are able to accept the optimization plugin). The plugin optimization routine may be provided by and may comprise optimization functions preferred by a user. If a plugin optimization routine is available, the operating system may select one of the data path layers to perform the plugin optimization routine, and also notify the other layers not to perform their optimization functions.

Figure 3:
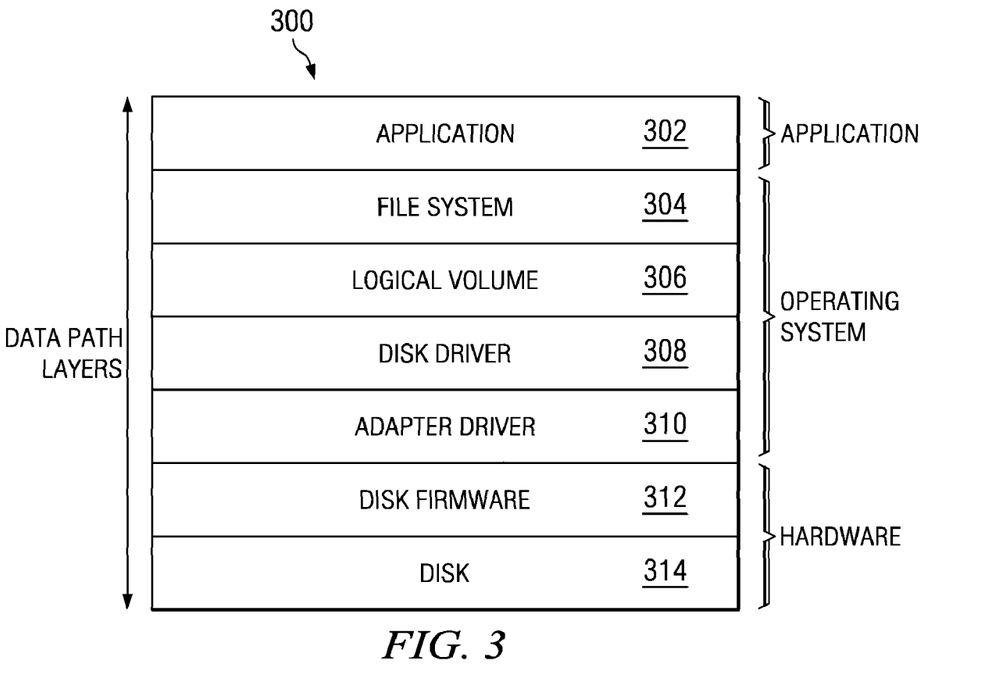
FIG. 3 is a block diagram illustrating an exemplary data transport path in accordance with the illustrative embodiments.

FIG. 3 is a block diagram illustrating an exemplary data transport path in accordance with the illustrative embodiments. In this example, data path architecture 300 is a 7-layer system. Data path architecture 300 demonstrates exemplary transport layers through which data passes when writing to disk. This architecture includes application layer 302, file system layer 304, logical volume layer 306, disk driver layer 308, adapter driver layer 310, disk firmware layer 312, and disk layer 314. Each layer is responsible for handling various data transport tasks. Each device driver layer in the data path may comprise hard-coded optimization algorithms comprising tasks for moving the data to its intended destination.

Application layer 302 interfaces directly to and provides services for an application program. This layer may also comprise software to ensure effective communication with other application programs. Application layer 302 also issues requests to the file system layer 304. Application layer 302 may pass data from an application program through data path architecture 300 and, upon receipt of data from file system layer 304, pass the data to the corresponding application modules for processing and taking actions dependent on the received data.

File system layer 304, logical volume layer 306, disk driver layer 308, and adapter driver layer 310 comprise device drivers located within the operating system. The device drivers comprise low-level software routines to manage data flow in and out of the hardware devices. File system layer 304 interfaces directly to and provides services for data access to a file system. This layer translates file operations, such as a write operation, to logical block operations for logical volume layer 306. File system 304 passes data to logical volume device driver layer 306.

Logical volume layer 306 provides an interface for the file system. This device driver layer operates on logical volumes and manages and processes all input/output operations. Logical volume layer 306 translates logical addresses into physical addresses and sends input/output requests to specific device drivers.

Disk driver 308 and adapter driver 310 convert service requests to device-specific commands and convert device-specific status information to a device-independent format. Disk driver 308 provides support for a particular hardware disk. Adapter driver 310 provides support for a particular adapter card.

Disk firmware layer 312 and disk layer 314 comprise the low-level software routines to access the device hardware. These routines read and store fixed length sectors in the disk.

The illustrative embodiments allow the operating system to manage and control the optimization algorithms performed within the device driver layers of the data transport path. In this illustrative example, the device driver layers in the operating system comprise file system layer 304, logical volume layer 306, disk driver layer 308, and adapter driver layer 310. In conventional optimization algorithm methods, optimization bandwidth is wasted since redundant or competing optimization routines may be performed in the data transport path. Consider an example in which data transport layers contain the same optimization routine (e.g., elevator sort algorithm). In this example, two file systems are being used by two applications (application A and B), and both of these file systems have their own logical volumes. However, both logical volumes write to the same (eventual) disk. When application A writes its data (data A), logical volume A performs its optimization algorithm (e.g., sort the data in elevator order). Logical volume A then sends the sorted data to the disk driver. In a parallel action, when application B writes its data (data B), logical volume B also performs its optimization algorithm (e.g., sort the data in elevator order). Logical volume B then sends the sorted data to the disk driver layer. When the disk driver layer receives sorted data A and sorted data B, the disk driver layer combines data A and data B and performs its optimization algorithm to sort the combined data in elevator order. Consequently, the elevator sort performed by the disk driver layer invalidates the optimizations performed in logical volume layer A and logical volume layer B.

In contrast with the conventional optimization methods, the illustrative embodiments allow the operating system to select, in cases where there are transport layers in the data path which contain redundant or competing optimization algorithms, which transport layer will perform its optimization algorithm. In the example above, the operating system will notify logical volumes A and B to skip their optimization functions, while allowing the disk driver layer to perform its optimization function. The operating system may determine which layer in the data transport path will actually perform its optimization routine based on the goal of reducing the redundancy in the routines performed in each device driver layer. Thus, in this example, the logical volume layers are prevented from performing their sorting routines since the disk driver layer will perform the same sorting routine on the combined set of data anyway.

Figure 4A:
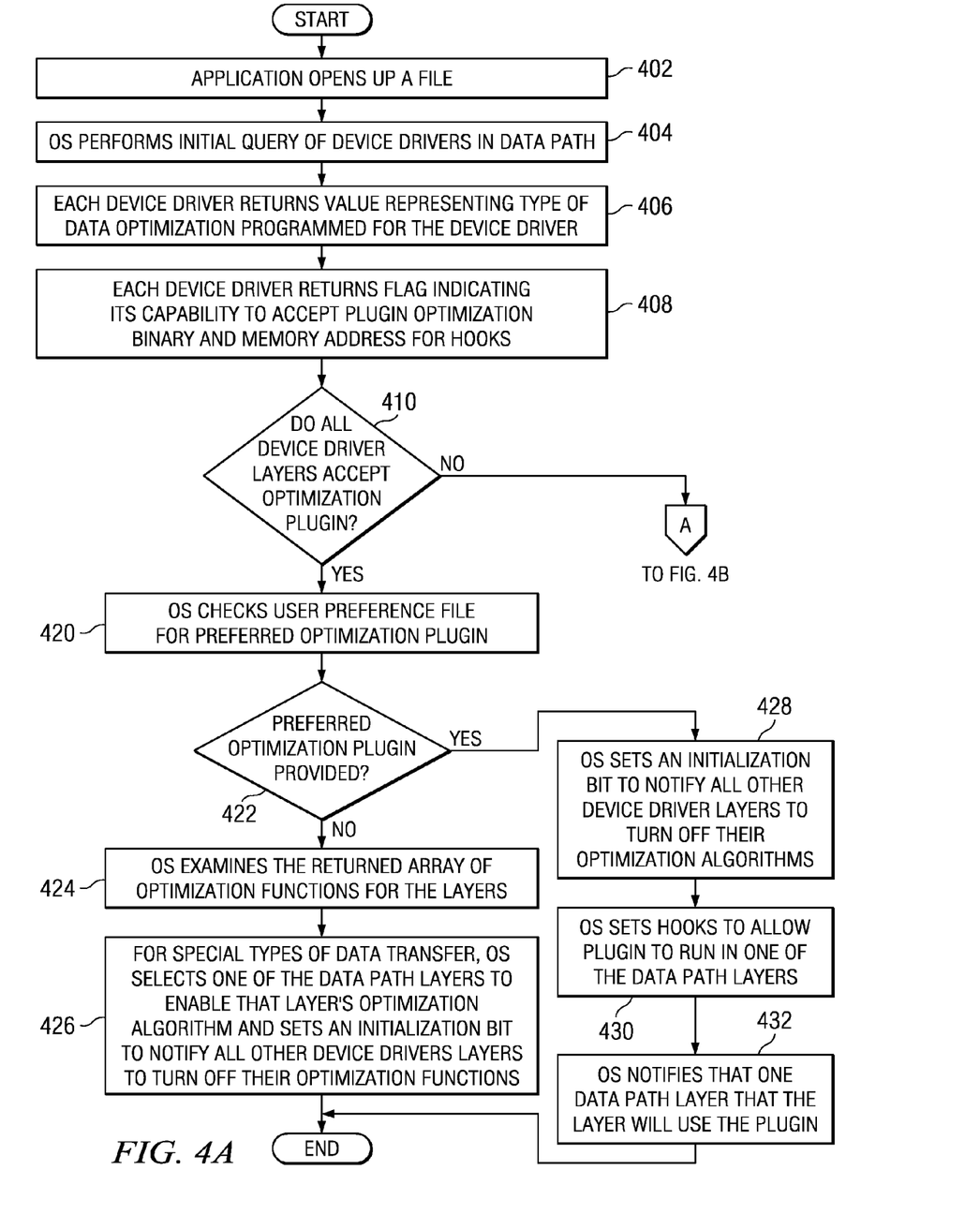
FIGS. 4A and 4B depict a flowchart of a process for overriding potential competing algorithms within transport layers of device drivers.
Figure 4B:
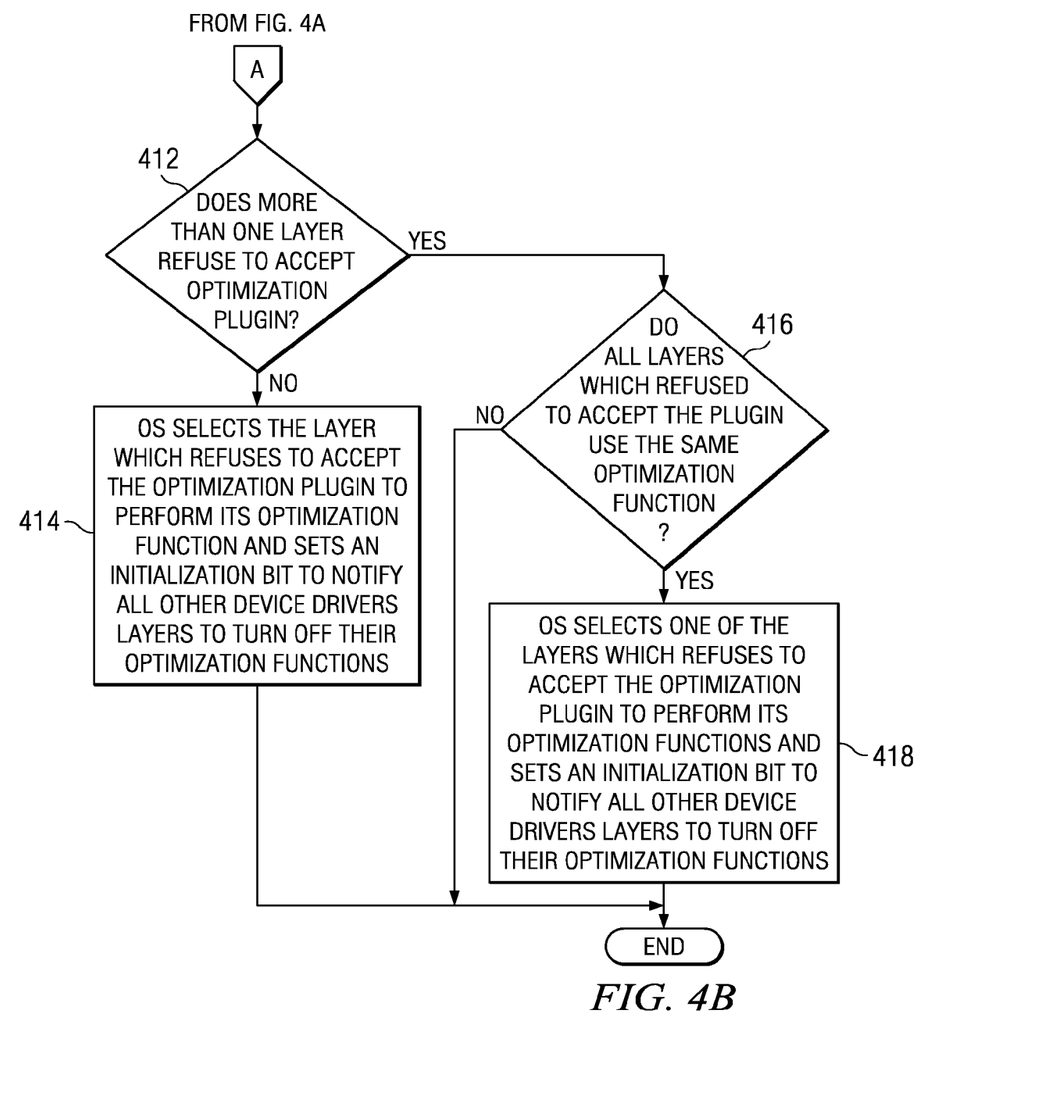

FIGS. 4A and 4B depict a flowchart of a process for overriding potential competing algorithms within transport layers of device drivers. The process described in FIGS. 4A and 4B may be implemented in software architecture 200 in FIG. 2.

The process begins when an application, through application layer 302 in FIG. 3, opens up a file through the operating system (step 402). The operating system may then perform an initial query of device drivers in the data layer path (step 404). This initial query is typically performed by the operating system upon boot up of the computer system. The query is used to obtain information (e.g., type of optimization routine) from each device driver in the computer system. The operating system may then store the information from the device drivers. Consequently, the operating system may only need to perform the query of a device driver when the operating system detects new hardware in the computer system.

In response to the query, each device driver returns a value to the operating system which represents the type of data optimization routine that driver has been programmed to execute (step 406). For example, the driver may be programmed to execute an elevator sort function, a closest head sort function, or a least busy sort function, etc. Each device driver returns an indicator (e.g., a flag) to the operating system which indicates whether the device driver is capable of accepting a plug-in optimization binary (step 408). The device drivers also return a memory address in which a hook to the plugin may be inserted. A hook, as generally known in the art, is a break point or call out that is used to call an outside routine or function for additional processing, such as the optimization plugin in this example.

A device driver may not accept optimization plugins if a device driver is not written to accept third party plugins. For example, a device driver may be written for a specific card and chip. The behavior of this card and chip may be proprietary, thus no one may know how to write a third party plugin for this card or chip. The device driver may also not accept optimization plugins if the device driver is so old that the concept of plugins is foreign to the binary. An example of such a device driver is a program in which nothing has changed in the last 20 years, and no one has taken the time to re-write parts of that program to work with plugins.

The operating system then makes a determination as to whether the indicators received indicate that all of the device driver layers in the data path accept optimization plugins (step 410). If at least one of the data path layers does not accept optimization plugins ('no' output of step 410), the operating system determines if more than one of the data path layers does not accept optimization plugins (step 412). If only one layer has indicated that it does not accept optimization plugins ('no' output of step 412), the operating system selects this layer to perform the layer's optimization function and sets initialization bits in the configuration data structure of the other layers or device drivers to notify all of the other device drivers in the data path to turn off their optimization functions (step 414), with the process terminating thereafter. As a result, all of the other device drivers in the data path will not perform their optimization functions. The notifications to the other device drivers are used by the operating system to override the optimization algorithms programmed in these particular drivers. By selecting one data path layer to perform its optimization function, the wasted repetition of optimization actions may be avoided.

Turning back to step 412, if more than one layer has indicated that it does not accept optimization plugins ('yes' output of step 412), the operating system determines whether the layers which refuse to accept the optimization plugin employ the same optimization function (step 416). If these layers employ the same optimization function ('yes' output of step 416), the operating system selects one of the layers to perform its optimization function, while setting initialization bits in the configuration data structure of the other layers or device drivers to notify all of the other device drivers in the data path (including the other device driver layers which refuse to accept the optimization plugin and which perform the same optimization function) to turn off their optimization functions (step 418), with the process terminating thereafter. The operating system determines which one of the layers will actually perform its optimization function based on the goal of reducing the redundancy in the optimization processes of the layers.

Turning back to step 416, if these layers do not employ the same optimization function ('no' output of step 416), the operating system does not enforce any particular optimization functions and the process terminates thereafter.

Turning back to step 410, if all of the data path layers accept optimization plugins ('yes' output of step 410), the operating system checks a user preference file to determine if a preferred optimization plugin has been provided (step 420). A preferred optimization plugin may be provided by the user when the user desires a specific optimization function to be performed. A determination is made by the operating system as to whether a preferred optimization plugin has been provided (step 422). If there is no preferred optimization plugin available ('no' output of step 422), the operating system examines the returned array of optimization options for the data path layers (step 424). These optimization options are obtained from the values received from the individual device driver layers in step 406. The operating system then selects one of the data path layers to enable that layer's optimization function, while setting initialization bits in the configuration data structure of the other layers or device driver to notify all of the other layers to turn off their optimization functions (step 426). The operating system may select the data path layer which will perform its optimization function based on the type of data transfer, such as a raw data transfer, a block input/output data transfer, etc. The operating system may also select the layer which will perform its optimization function based on the goal of reducing the redundancy in the optimization processes of the layers.

Turning back to step 422, if there is a preferred optimization plugin available ('yes' output of step 422), the operating system sets initialization bits in the configuration data structure of the other layers or device drivers to notify all of the other device drivers in the data path to turn off their optimization functions (step 428). The operating system then sets the hooks which allow the optimization plugin to run in one of the data path layers (step 430). The operating system notifies the selected data path layer that the layer will be the one using the optimization plugin (step 432), with the process terminating thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing data optimization routines in device drivers in a data transmission path, the computer implemented method comprising:
   identifying data optimization routines associated with the device drivers in the data transmission path;
   responsive to receiving data in the data transmission path, determining whether a data optimization routine associated with a device driver in the data transmission path comprises a same optimization or a competing optimization as a data optimization routine associated with one or more other device drivers in the data transmission path;
   responsive to a determination that the data optimization routine associated with the device driver comprises a same optimization routine or a competing optimization routine as the data optimization routine associated with the one or more other device drivers, selecting one of the device drivers to perform its associated data optimization routine on the data; and
   notifying the one or more other device drivers in the data transmission path to skip their associated data optimization routines on the data, wherein the data optimization routines include sort functions.

2. The computer implemented method of claim 1, wherein determining whether a data optimization routine associated with a device driver in the data transmission path comprises a same optimization or a competing optimization as a data optimization routine associated with one or more other device drivers in the data transmission path further comprises:
   sending a data optimization routine query to the device drivers in the data transmission path; and
   receiving a value from each device driver, wherein the value indicates a type of data optimization routine programmed within the device driver.

3. The computer implemented method of claim 1, wherein the selection of one of the device drivers to perform its associated data optimization routine on the data when the data optimization routine associated with the device driver comprises a same optimization routine as the data optimization routine associated with the one or more other device drivers prevents an action by one device driver from invalidating a previous action by another device driver.

4. The computer implemented method of claim 1, wherein notifying the one or more other device drivers in the data transmission path to skip their associated data optimization routines on the data further comprises:
   setting initialization bits in a configuration data structure of the one or more other device drivers to notify the one or more other device drivers to turn off their associated data optimization routines.

5. The computer implemented method of claim 1, wherein notifying the one or more other device drivers in the data transmission path to skip their associated data optimization routines on the data includes notifying all other device drivers in the data transmission path to skip their data optimization routines on the data.

6. The computer implemented method of claim 1, further comprising:
   determining whether all of the device drivers in the data transmission path accept optimization plugins;
   responsive to a determination that all of the device drivers in the data transmission path accept optimization plugins, obtaining a preferred data optimization plugin routine;
   notifying all of the device drivers in the data transmission path to skip their associated data optimization routines on the data;
   inserting a hook in a selected device driver in the data transmission path; and
   notifying the selected device driver to perform the data optimization plugin routine on the data.

7. The computer implemented method of claim 1, further comprising:
   determining whether only one of the device drivers in the data transmission path does not accept optimization plugins;
   responsive to a determination that only one of the device drivers in the data transmission path does not accept optimization plugins, selecting the device driver that does not accept optimization plugins to perform its associated data optimization routine on the data; and
   notifying other device drivers in the data transmission path to skip their associated data optimization routines on the data.

8. The computer implemented method of claim 1, further comprising:

determining whether a plurality of the device drivers in the data transmission path do not accept optimization plugins;

responsive to a determination that the plurality of the device drivers in the data transmission path do not accept optimization plugins, determining if the plurality of the device drivers contain a same data optimization routine;

responsive to determining that the plurality of the device drivers contain the same data optimization routine, selecting a device driver in the plurality of the device drivers to perform its associated data optimization routine on the data; and notifying other device drivers in the data transmission path to skip their associated data optimization routines on the data.

9. A data processing system for managing data optimization routines in device drivers in a data transmission path, the data processing system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to identify data optimization routines associated with the device drivers in the data transmission path; determine, in response to receiving data in the data transmission path, whether a data optimization routine associated with a device driver in the data transmission path comprises a same optimization or a competing optimization as a data optimization routine associated with one or more other device drivers in the data transmission path; select, in response to a determination that the data optimization routine associated with the device driver comprises a same optimization routine or a competing optimization routine as the data optimization routine associated with the one or more other device drivers, one of the device drivers to perform its associated data optimization routine on the data; and notify the one or more other device drivers in the data transmission path to skip their associated data optimization routines on the data, wherein the data optimization routines include sort functions.

10. The data processing system of claim 9, wherein the computer usable code to determine whether a data optimization routine associated with a device driver in the data transmission path comprises a same optimization or a competing optimization as a data optimization routine associated with one or more other device drivers in the data transmission path further comprises computer usable code to send a data optimization routine query to the device drivers in the data transmission path; and receive a value from each device driver, wherein the value indicates a type of data optimization routine programmed within the device driver.

11. The data processing system of claim 9, wherein the computer usable code to select one of the device drivers to perform its associated data optimization routine on the data when the data optimization routine associated with the device driver comprises a same optimization routine as the data optimization routine associated with the one or more other device drivers prevents an action by one device driver from invalidating a previous action by another device driver.

12. The data processing system of claim 9, wherein the computer usable code to notify the one or more other device drivers in the data transmission path to skip their associated data optimization routines on the data further comprises computer usable code to set initialization bits in a configuration data structure of the one or more device drivers to notify the one or more other device drivers to turn off their associated data optimization routines.

13. The data processing system of claim 9, wherein the computer usable code to notify the one or more other device drivers in the data transmission path to skip their associated data optimization routines on the data includes computer usable code to notify all other device drivers in the data transmission path to skip their data optimization routines on the data.

14. The data processing system of claim 9, wherein the processing unit further executes the computer usable code to determine whether all of the device drivers in the data transmission path accept optimization plugins; obtain, in response to a determination that all of the device drivers in the data transmission path accept optimization plugins, a preferred data optimization plugin routine; notify all of the device drivers in the data transmission path to skip their associated data optimization routines on the data; insert a hook in a selected device driver in the data transmission path; and notify the selected device driver to perform the data optimization plugin routine on the data.

15. The data processing system of claim 9, wherein the processing unit further executes the computer usable code to determine whether only one of the device drivers in the data transmission path does not accept optimization plugins; select, in response to a determination that only one of the device drivers in the data transmission path does not accept optimization plugins, the device driver that does not accept optimization plugins to perform its associated data optimization routine on the data; and notify other device drivers in the data transmission path to skip their associated data optimization routines on the data.

16. The data processing system of claim 9, wherein the processing unit further executes the computer usable code to determine whether a plurality of the device drivers in the data transmission path do not accept optimization plugins; determine, in response to a determination that a plurality of the device drivers in the data transmission path do not accept optimization plugins, if the plurality of the device drivers contain a same data optimization routine; select, in response to determining that the plurality of the device drivers contain the same data optimization routine, a device driver in the plurality of the device drivers to perform its associated data optimization routine on the data; and notify other device drivers in the data transmission path to skip their associated data optimization routines on the data.

17. A computer program product for managing data optimization routines in device drivers in a data transmission path, the computer program product comprising:

a computer usable storage device having computer usable program code tangibly embodied thereon, the computer usable program code comprising:

computer usable program code for identifying data optimization routines associated with the device drivers in the data transmission path;

computer usable program code for determining, in response to receiving data in the data transmission path, whether a data optimization routine associated with a device driver in the data transmission path comprises a same optimization or a competing optimization as a data optimization routine associated with one or more other device drivers in the data transmission path;

computer usable program code for selecting, in response to a determination that the data optimization routine associated with the device driver comprises a same optimization routine or a competing optimization routine as the data optimization routine associated with the one or more other device drivers, one of the device drivers to perform its associated data optimization routine on the data; and computer usable program code for notifying the one or more other device drivers in the data transmission path to skip their associated data optimization routines on the data, wherein the data optimization routines include sort functions.

18. The computer program product of claim 17, wherein the computer usable program code for determining whether a data optimization routine associated with a device driver in the data transmission path comprises a same optimization or a competing optimization as a data optimization routine associated with one or more other device drivers in the data transmission path further comprises:

computer usable program code for sending a data optimization routine query to the device drivers in the data transmission path; and computer usable program code for receiving a value from each device driver, wherein the value indicates a type of data optimization routine programmed within the device driver.

19. The computer program product of claim 17, wherein the computer usable program code for selecting one of the device drivers to perform its associated data optimization routine on the data when the data optimization routine associated with the device driver comprises a same optimization routine as the data optimization routine associated with the one or more other device drivers prevents an action by one device driver from invalidating a previous action by another device driver.

20. The computer program product of claim 17, wherein the computer usable program code for notifying the one or more other device drivers in the data transmission path to skip their associated data optimization routines on the data further comprises:

computer usable program code for setting initialization bits in a configuration data structure of the one or more device drivers to notify the one or more other device drivers to turn off their associated data optimization routines.

21. The computer program product of claim 17, wherein the computer usable program code for notifying the one or more other device drivers in the data transmission path to skip their associated data optimization routines on the data includes computer usable program code for notifying all other device drivers in the data transmission path to skip their data optimization routines on the data.

22. The computer program product of claim 17, further comprising:

computer usable program code for determining whether all of the device drivers in the data transmission path accept optimization plugins;

computer usable program code for obtaining, in response to a determination that all of the device drivers in the data transmission path accept optimization plugins, a preferred data optimization plugin routine;

computer usable program code for notifying all of the device drivers in the data transmission path to skip their associated data optimization routines on the data;

computer usable program code for inserting a hook in a selected device driver in the data transmission path; and computer usable program code for notifying the selected device driver to perform the data optimization plugin routine on the data.

23. The computer program product of claim 17, further comprising:

computer usable program code for determining whether only one of the device drivers in the data transmission path does not accept optimization plugins;

computer usable program code for selecting, in response to a determination that only one of the device drivers in the data transmission path does not accept optimization plugins, the device driver that does not accept optimization plugins to perform its associated data optimization routine on the data; and computer usable program code for notifying other device drivers in the data transmission path to skip their associated data optimization routines on the data.

24. The computer program product of claim 17, further comprising:

computer usable program code for determining whether a plurality of the device drivers in the data transmission path do not accept optimization plugins;

computer usable program code for determining, in response to a determination that the plurality of the device drivers in the data transmission path do not accept optimization plugins, if the plurality of the device drivers contain a same data optimization routine;

computer usable program code for selecting, in response to determining that the plurality of the device drivers contain the same data optimization routine, a device driver in the plurality of the device drivers to perform its associated data optimization routine on the data; and computer usable program code for notifying other device drivers in the data transmission path to skip their associated data optimization routines on the data.

* * * * *